United States Patent [19]

Yamada

[11] Patent Number: 4,627,012
[45] Date of Patent: Dec. 2, 1986

[54] COMBINATORIAL WEIGHING METHOD

[75] Inventor: Seiji Yamada, Kyoto, Japan

[73] Assignee: Ishida Scales Mfg. Co, Ltd., Kyoto, Japan

[21] Appl. No.: 726,600

[22] Filed: Apr. 23, 1985

[30] Foreign Application Priority Data

Apr. 25, 1984 [JP] Japan .................................. 59-083485
Apr. 25, 1984 [JP] Japan .................................. 59-083486

[51] Int. Cl.$^4$ ...................... G01G 19/22; G01G 19/52
[52] U.S. Cl. ........................................ 364/567; 177/1; 177/25; 177/50
[58] Field of Search ................ 177/1, 25, 50; 364/567

[56] References Cited

U.S. PATENT DOCUMENTS

| 4,341,274 | 7/1982 | Hirano et al. | 177/50 X |
| 4,418,771 | 12/1983 | Henry et al. | 177/25 X |
| 4,446,937 | 5/1984 | Asai | 177/1 |
| 4,511,010 | 4/1985 | Sashiki et al. | 177/50 X |
| 4,527,646 | 7/1985 | Hirano | 177/50 X |

Primary Examiner—George H. Miller, Jr.
Attorney, Agent, or Firm—Staas & Halsey

[57] ABSTRACT

A combinatorial weighing method for combinatorially weighing out articles supplied to a plurality of weighing machines includes the step of making a comparison between a predetermined percentage of a set target weight value and a sum total of weight values from weighing machines that have participated in a combinatorial weighing operation. This step is performed when an optimum combination is not obtained through a combinatorial calculation. Based on the results of the comparison, weighing machines indicating comparatively low weight values are supplied with additional articles. In another embodiment, the combinatorial weighing method includes the steps of executing combinatorial weighing using a number of weighing machines greater than a prescribed number, deciding on the basis of the sum total of the weight values from weighing machines that have participated in the combinatorial weighing operation whether to perform a combinatorial calculation one or more times, and changing over automatically between high-speed, low-capacity processing and low-speed, high-capacity processing in dependence upon the amount of articles supplied.

18 Claims, 3 Drawing Figures

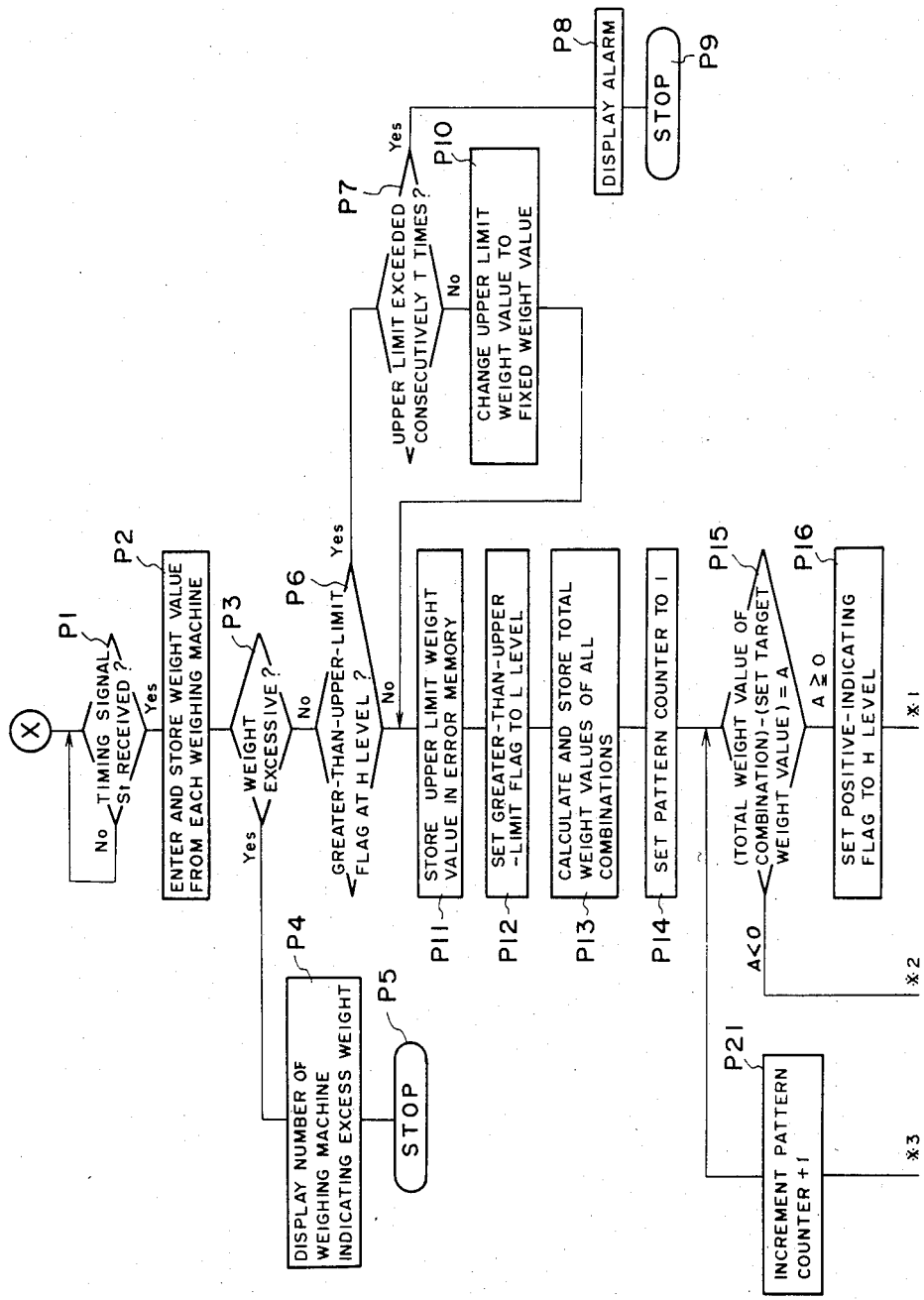
Fig.2 (1/3)

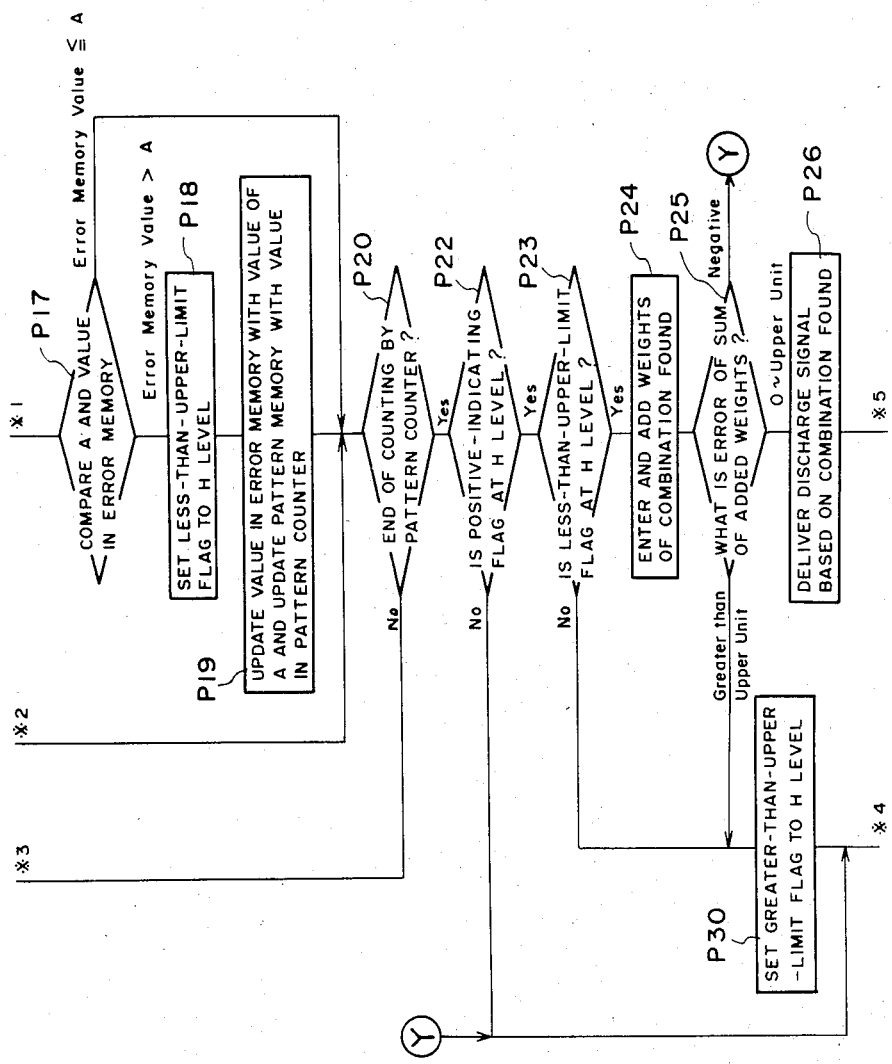
Fig. 2 (2/3)

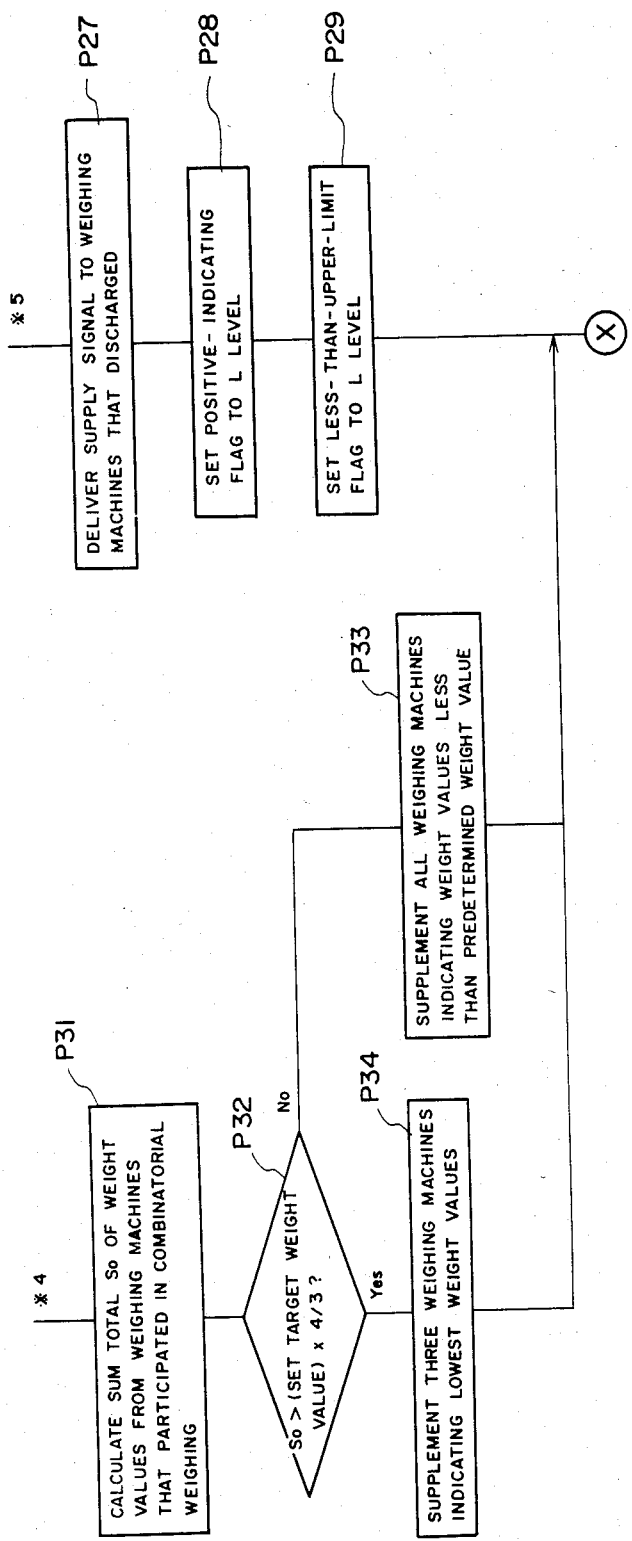
Fig. 2 (3/3)

COMBINATORIAL WEIGHING METHOD

BACKGROUND OF THE INVENTION

This invention relates to a combinatorial weighing method for execution by a combinatorial weighing apparatus of the type which performs a combinatorial calculation to form combinations of weight values indicative of the weights of articles weighed by a plurality of weighing machines, selects a weight value combination having an optimum total weight with respect to a set weight, and discharges the articles corresponding to the selected combination.

Let us describe a weighing apparatus of the above kind in greater detail. The apparatus includes a plurality of weighing machines into which articles are introduced to be weighed, and a calculation control unit constituted by a microcomputer or the like, which is provided with the measured weight values from the weighing machines. The calculation control unit combines the weight values into combinations, calculates the total weight of each combination, compares each total weight value with a set target weight, selects the combination (referred to as the "optimum combination") the total weight value of which is equal to the set target weight or closest to the set target weight within upper and lower limit weight values, and causes those weight machines that have provided the weight values belonging to the optimum combination to discharge their articles.

FIG. 1 is a block diagram of an example of such a combinatorial weighing apparatus. The apparatus includes a plurality of weighing machines 1-1, 1-2, ... 1-n each of which has a weight sensor (not shown) for weighing articles with which the weighing machines are supplied, the weighing machines producing weight data W1, W2, ... Wn, respectively, indicative of the weights measured thereby. Each item of weight data is an analog value. It should be noted that each weighing machine also includes a weighing hopper (not shown) that actually receives the articles to be weighed, and a pool hopper (not shown) for resupplying the weighing hopper, as will be set forth below. The weight data W1, W2, ... Wn are fed into a multiplexer 2, constituted by analog switches or the like, adapted to deliver the items of weight data one at a time in sequential fashion to an AD converter 3 in response to a changeover signal Sv received from a calculation control unit 4. The AD converter 3 converts the weight data W1, W2, ... Wn received from the multiplexer 2 into digital values and feeds the digital weight data into the calculation control unit 4. The latter is composed of a microcomputer for performing a combinatorial calculation on the basis of the weight data and includes a processor, various memories (such as a program memory) and working memory, and input/output interface circuitry. An upper limit weight setting unit 5, a target weight setting unit 6, and a lower limit weight setting unit 7 respectively provide the calculation control unit 4 with an upper limit weight value Wp, a set target weight Wa, and a lower limit weight value Wo set thereby.

In operation, a packing machine (not shown) applies a timing signal St to the calculation control unit 4 when the packing machine is ready to pack a batch of weighed articles. The calculation control unit 4 responds by delivering the changeover signal Sv to the multiplexer 2. The latter responds in turn by sequentially supplying the AD converter 3 with the weight data W1, W2, ... Wn indicative of the weights of the articles measured by the respective weighing machines 1-1, 1-2, ... 1-n. The AD converter 3 converts the analog weight data input thereto into digital signals and feeds these signals into the calculation control unit 4. The latter, in response to a signal from the internal program memory, successively generates $2^n - 1$ combination patterns (where n is the number of weighing machines) on the basis of the weight data from the AD converter 3, each patterns being a combination of weight values, and calculates the total weight of each combination. The calculation control unit 4 also compares the total weight value of each combination pattern with the set value Wa from the target weight setting unit 6, and finds the combination, namely the aforementioned optimum combination, the total weight value of which is equal to Wa or closest to Wa within the upper and lower limit weight values Wp, Wo from the upper and lower limit weight value setting units 5, 7, respectively. The calculation control unit 4 applies a discharge signal Se to the weighing hoppers of the weighing machines corresponding to the selected optimum combination, causing these weighing hoppers to discharge their articles. The calculation control unit 4 applies a supply signal Sf to those pool hoppers corresponding to the weighing machines that have discharged their articles, whereby these pool hoppers dump their articles into the underlying weighing hoppers of said weighing machines. It should be noted that the lower limit weight value setting unit 7 may be deleted from the illustrated arrangement so that the articles may be discharged from the weighing machines using only the upper limit value and the set target weight. This method is preferred when weighing out commodities.

There are occasions when an optimum combination cannot be obtained. The usual practice at such time is to supply prescribed weighing machines with additional articles in order to raise the precision of the combinatorial weighing operation. This supplementary feed of articles is carried out for all weighing machines that provide weight data indicative of a weight value less than a fixed value, or for a prescribed number of weighing machines whose weight data indicate weight values small in comparison with the other weight values. Conventionally, the changeover between these two supplementary feed modes is performed by an operator who, relying upon his experience, operates a changeover switch to select the particular mode. This constitutes a disadvantage of the prior art since the necessity of the changeover switch results in a combinatorial weighing apparatus of a more complicated construction and operation.

A combinatorial weighing apparatus operates on the premise that the amount of articles supplied to it from a commodity production system located upstream is approximately constant. It is therefore required that the weighing apparatus have an article processing capability slightly higher than that actually needed to process the articles with which it is supplied. In order to assure that the weighing apparatus will have such a capability, two configurations of the weighing apparatus are available. One is a high-speed, low-capacity combinatorial weighing apparatus for dealing with a target weight value that is comparatively small. The apparatus executes so-called high-speed, low-capacity processing and performs combinatorial weighing at a high rate of speed. The other is a low-speed, high-capacity combinatorial weighing apparatus for dealing with a target weight value that is comparatively large. The apparatus executes so-called low-speed, high-capacity processing and performs combinatorial weighing at low speed. The two types of apparatus differ in terms of the number of weighing machines and the capacity of the weighing hoppers for suitably adjusting the amount of articles supplied per weighing machine by distributive feed.

In a case where the production schedule requires that the high-speed, low-capacity combinatorial weighing apparatus execute low-speed, high-capacity processing, the amount of articles supplied to each weighing machine will be too small if the target weight value is merely raised. This means that a large number of the weighing machines will be selected for the optimum combination, which makes it necessary for all of the weighing machines to participate in the combinatorial calculations for selecting the optimum combination. This prolongs the time needed for the calculations and necessitates modification of the calculation program.

One method of operating the combinatorial weighing apparatus is to divide a single target weight value in half, perform combinatorial weighing twice,, i.e., in two cycles, once for each half of the target value, and discharge the articles at each of the two cycles to arrive at a total weight value which is equivalent to the target weight value. This is so-called multiple weighing processing. Nevertheless, a combinatorial weighing apparatus for practicing this method still necessitates modification of the combinatorial calculation program as well as a modification of circuitry for allowing the packing machine, which is connected to the weighing apparatus, to perform a single packing and sealing operation only after receiving the discharge signal from the weighing apparatus twice. Such an arrangement is inconvenient for dealing with unexpected or sudden changes in the production schedule.

Though it is possible to adopt the low-speed, high-capacity type combinatorial weighing apparatus in which the amount of articles supplied to each weighing machine is increased and a batch of the articles is discharged through a single combinatorial calculation, adjustment of the amount of articles supplied is troublesome, a considerable number of unsatisfactory weighing cycles occur until supply is stabilized, and the capacity of the weighing hoppers imposes a limitation upon the amount by which the supply of articles can be increased.

SUMMARY OF THE INVENTION

An object of the present invention is to provide a combinatorial weighing method whereby the construction of a combinatorial weighing apparatus is simplified and the operability thereof enhanced by supplementing specific weighing machines of the weighing apparatus with articles automatically.

Another object of the present invention is to provide a combinatorial weighing method whereby it is possible to automatically switch between high-speed, low-capacity type combinatorial processing and low-speed, high-capacity type combinatorial processing in dependence upon the amount of articles supplied.

According to one aspect of the present invention, the foregoing objects are attained by providing a combinatorial weighing method implemented by a combinatorial weighing apparatus having a plurality of weighing machines for sensing the weight of articles supplied thereto and for producing weight data indicative of the sensed weights, a calculation control unit for performing a combinatorial calculation based on the weight data from the weighing machines, and setting units for setting a target weight value and allowable limits for a combinatorial weighing operation, the method including steps of:

(a) subjecting the weight data to a combinatorial calculation performed by the calculation control unit on the basis of predetermined combination patterns;

(b) calculating, using the calculation control unit, the total weight indicated by the weight data from weighing machines that have participated in combinatorial weighing, this step being executed when the combinatorial calculation of step (a) does not yield an optimum combination; and (c) supplementing a predetermined number of weighing machines which indicate comparatively low weight values with articles upon comparing, by means of the calculation control unit, the total weight calculated in step (b) with a predetermined percentage of the set target weight value.

According to another aspect of the present invention, there is provided a combinatorial weighing method implemented by the aforesaid combinatorial weighing apparatus, which method comprises:

(a) determining, using the calculation control unit, whether a number of weighing machines capable of participating in a combinatorial calculation is greater than a predetermined number;

(b) calculating, using the calculation control unit, the total weight indicated by the weight data from the weighing machines capable of participating in the combinatorial calculation, this step being executed when the number of weighing machines is determined in step (a) to be greater than the predetermined number;

(c) deciding the calculation frequency upon comparing, by means of the calculation control unit, the total weight calculated in step (b) with a predetermined percentage of the set target weight value; and (d) executing control, using the calculation control unit, to perform a combinatorial calculation the number of times decided in step (c), obtain an optimum combination and discharge articles from weighing machines corresponding to the optimum combination.

Other features and advantages of the present invention will be apparent from the following description taken in conjunction with the accompanying drawings.

BRIEF DESCRIPTION OF THE DRAWINGS

FIG. 2 is a flowchart for a processing sequence of a first embodiment of a combinatorial weighing method according to the present invention.

DESCRIPTION OF THE PREFERRED EMBODIMENTS

Figure 1:
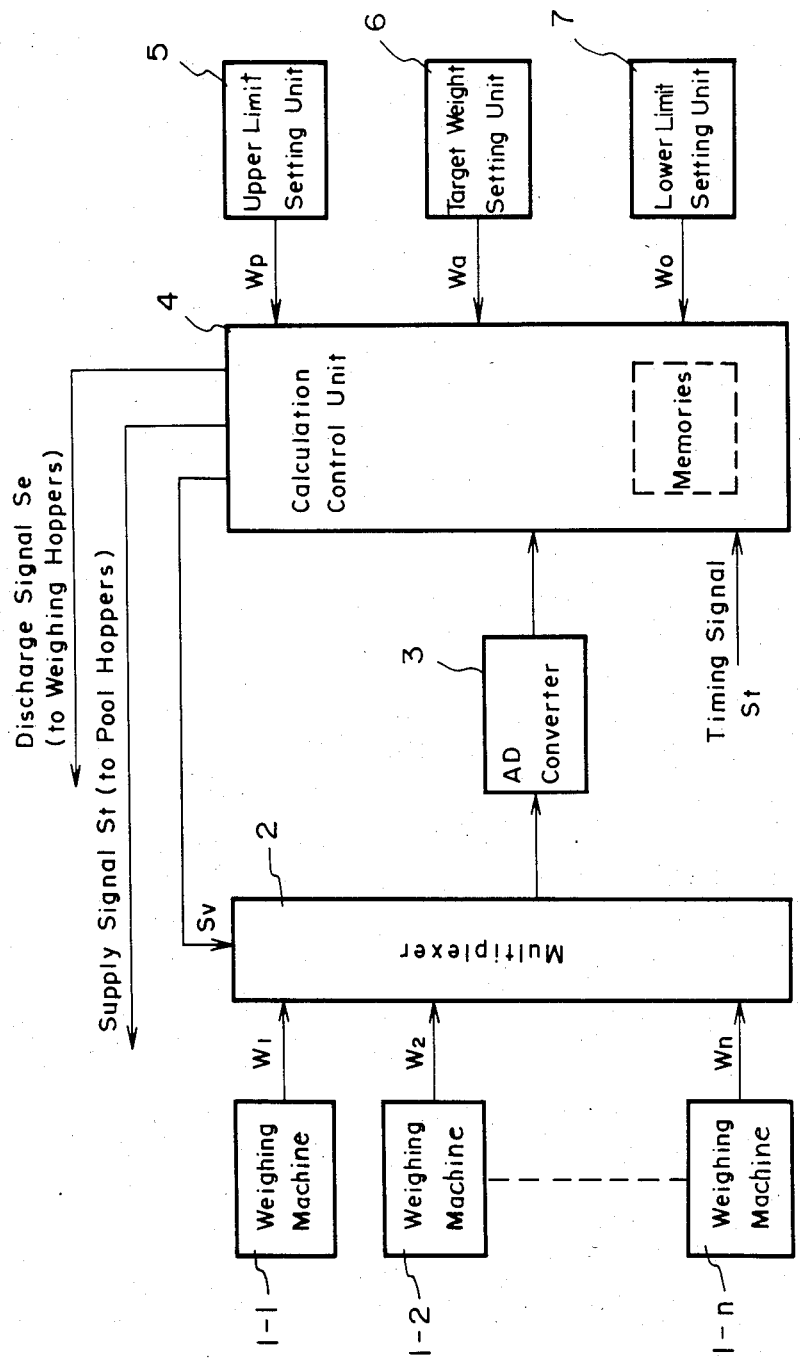
FIG. 1 is a block diagram of a combinatorial weighing apparatus.

A first embodiment of the present invention will now be described with references to the flowchart of FIG. 2, which illustrates a processing sequence for an automatic changeover to supplement specific weighing machines of a combinatorial weighing apparatus with articles to be weighed.

(1) Upon confirming that a packing machine has supplied it with the timing signal St, the calculation control unit 4 reads in the weight data from the weighing machines 1-1, 1-2, ... 1-n and stores the data in an internal memory. These operations correspond to steps P1, P3 of the flowchart. Next, steps P2 through P5 call for the calculation control unit 4 to render a decision as to whether any of the weighing machines shows an excessively high weight reading, display the number of any such weighing machine on a display device (not shown) and then halt processing.

A reference value, denoted B, expressing an excessively high weight reading is defined by the following:

set target weight value+upper limit weight value=B

However, if the reference value B is greater than the maximum weighing capacity of the weighing machines 1-1, 1-2, ... 1-n, the maximum weighing capacity serves as the reference value.

(2) If the decision at the step P3 is that the weight reading is not excessive, then the program proceeds to a step P6, where the calculation control unit 4 investigates the logic level of an area of the internal memory for a flag which indicates that the upper limit value has been exceeded. The flag will be at a high (i.e., "1") logic level if, in the immediately preceding combinatorial weighing cycle, the total weight of a combination closest to the set target weight Wa exceeded the upper limit weight value Wp set by the upper limit setting unit 5, that is, if unsatisfactory results were obtained in the preceding weighing cycle. If the flag is at the high level, then the calculation control unit 4 checks at a step P7 whether this unsatisfactory condition, in which the upper limit value is exceeded, has occurred continuously for a predetermined number (i.e., T) of weighing cycles. If this is the case, then an alarm is indicated at a step P8 and processing is halted at a step P9. If the decision at the step P7 is that the unsatisfactory weighing operation has not continued for the predetermined number of cycles, then the calculation control unit 4 changes the upper limit weight value to a fixed weight value at a step P10. The program then proceeds to a step P11.

(3) The step P11 calls for the calculation control unit 4 to store the upper limit weight value in an error memory. This is followed by a step P12, at which the above-mentioned flag is set to the low logic level. Next, at a step P13, the calculation control unit 4 executes a combinatorial addition to compute the total weight value of every combination of $2^n-1$ combination patterns, where n is the number of weighing machines, and stores the total weight values of all combinations. The program proceeds to a step P14, at which the calculation control unit 4 sets a pattern counter to 1, and then to a step P15, where the calculation control unit 4 reads the total weight value of each and every combination pattern out of memory sequentially, one value at a time, performs the following calculation:

total weight value−set target weight value=A, and determines whether the condition $A \geq 0$ is satisfied. If it is, a positive-indicating flag in the internal memory is set to the high logic level at a step P16, followed by a step P17, at which the difference A (between the total weight value and the set target weight value) and the value stored in the error memory at the step P11 are compared. If the value in the error memory is greater than A, the calculation control unit 4 sets a flag, which indicates that the upper limit value has not been exceeded, to the high logic level and updates the error memory to the value of A. The calculation control unit 4 also updates a pattern memory with the value of the count in the pattern counter. These steps are steps P18 and P19 of the flowchart. Thereafter, the calculation control unit 4 continues executing steps P15 through P19 while incrementing the pattern counter, until the pattern counter can count no further (steps P20, P21).

(4) Next, at a step P22, the calculation control unit 4 determines whether the positive-indicating flag is at the high level, namely whether the total weight value of a combination is greater than the set target weight. If the decision here is affirmative, the program proceeds to a step P23; if negative, namely if the total weights of all combinations are less than the target weight value, which condition indicates that the combinations are unsatisfactory, then the program proceeds to a step P31. Step P23, executed when the positive-indicating flag is found to be at the high level, calls for the calculation control unit 4 to determine whether the flag indicating that the upper limit value has not been exceeded, is at the high logic level. If it is, namely if the total weight of a combination is less than the upper limit weight value, then the program proceeds to a step P24. If the decision at the step P23 is negative, namely if the total weight values of all combinations are greater than the upper limit weight value, this indicates that the combinations are unsatisfactory and the program proceeds to a step P30.

(5) The step P24, executed when the flag is found to be at the high logic level at the step P23, calls for the calculation control unit 4 to again read in weight data from the weighing machines corresponding to the combination found, and add the weight values indicated by the weight data. This is followed by a step P25, at which the calculation control unit 4 checks the error of the total weight value resulting from the addition process of the step P24. If the error is between zero and the upper limit weight value, the calculation control unit 4 delivers, at a step P26, the article discharge signal Se to the weighing machines corresponding to the combination found, in response to which these weighing machines discharge their articles. Then, at a step P27, the calculation control unit 4 provides the weighing machines that have discharged their articles with the supply signal St, whereby these weighing machines are resupplied with articles to be weighed. The calculation control unit 4 then sets the positive-indicating flag to the low logic level at a step P28, and sets the flag indicating that the upper limit weight value has not been exceeded to the low logic level at a step P29. The program then returns to point X.

(6) If it is decided at the step P23 that the flag indicating that the upper limit weight value has not been exceeded is not at the high level, the calculation control unit 4 executes the step P30, at which the flag indicating that the upper limit weight value has been exceeded, is set to the high logic level. Next, at a step P31, the calculation control unit 4 calculates the sum total (So) of the weight values indicated by the weight data from those weighing machines that have participated in combinatorial weighing. This is followed by a step P32, which calls for the calculation control unit 4 to compare the sum total So with a predetermined percentage of the target weight value and to determine whether the following condition, which serves as one example, holds:

So > target weight value × 4/3

If this condition is satisfied, the program proceeds to a step P34, at which weighing machines indicating weight values small in comparison with the other weight values are supplied with additional articles. By way of example, three weighing machines indicating the lowest weight values are selected successively starting from the one whose weight value is smallest, and these weighing machines are supplemented. If the decision at the step P32 is that the above condition is not satisfied, the program proceeds to a step P33, at which all weighing machines whose weight values are below a fixed weight value are supplied with additional articles.

Thus, with the method illustrated by the flowchart of FIG. 2, the precision of the combinatorial weighing operation is enhanced and processing is executed at high speed.

Figure 3:
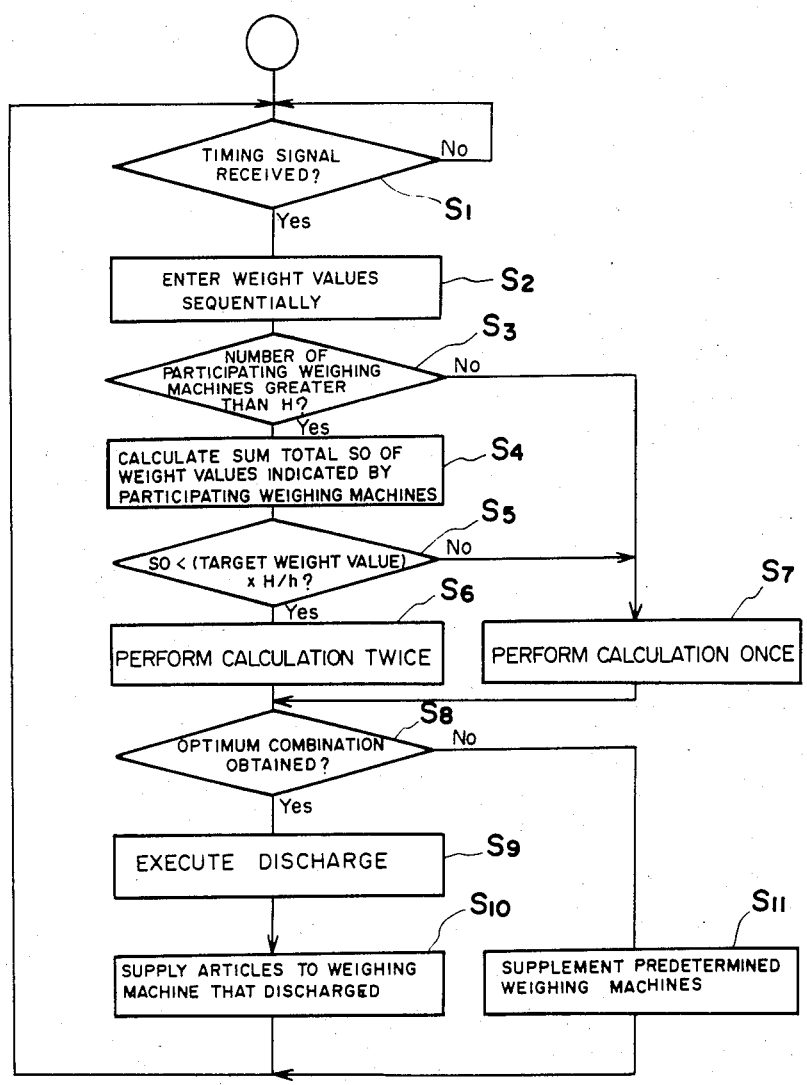
FIG. 3 is a flowchart for a processing sequence of a second embodiment of a combinatorial weighing method according to the present invention.

A second embodiment of the combinatorial weighing method of the present invention will now be described with reference to the flowchart of FIG. 3, which indicates a processing sequence for automatically changing over the frequency of combinatorial calculations.

(1) Step S1 of the flowchart calls for the calculation control unit 4 to start the processing for changing over the combinatorial calculation frequency and to check whether the packing machine has produced a timing signal. If the decision is affirmative, the program proceeds to a step S2, at which weight data from the weighing machines 1-1, 1-2, ... 1-n enter the calculation control unit 4 in successive fashion.

(2) Next, at a step S3, the calculation control unit 4 checks whether the number of weighing machines capable of participating in combinatorial weighing is greater than a value H. If this condition is not satisfied, then the program proceeds to a step S7, described below. As to the value of H, assume that the combinatorial weighing apparatus has 14 weighing machines. In a weighing activity, some weighing machines are incapable of prticipting for reasons such as zero-point adjustment, etc. If the number of such weighing machines is two, this number is subtracted from 14 to arrive at 12, namely the number of machines capable of participating in combinatorial calculations. The calculation control unit 4 thus determines at the step S3 whether the number 12 exceeds H.

(3) Next, the calculation control unit 4 calculates at a step S4 the sum total (So) of the weight values indicated by the weighing machines capable of participating in combinatorial calculations.

(4) The program then moves to a step S5, where the calculation control unit 4 compares the sum total So with a predetermined percentage of the target weight value Wa. In other words, the calculation control unit 4 determines whether the following condition is satisfied:

So < target weight value × H/h    (a)

where H is the number of weighing machines capable of participating in the combinatorial calculations, and h is any number. By way of example, h may be selected so that the value of H/h is two.

(5) If the decision at the step S5 is affirmative, namely if condition (a) is satisfied, the program proceeds to a step S6, at which the calculation control unit 4 performs a combinatorial calculation twice. Thus, by way of example, if the target weight value Wa is 1 Kg, H/h is 2 and So is found to be less than 2 Kg at the step S5, this indicates that each weighing machine has been supplied with too few articles. In such cases, the calculation control unit 4 selects two-thirds of the number H of weighing machines capable of participating in combinatorial calculations and, using the weight values from 2H/3-number of weighing machines, executes a combinatorial calculation one time so as to obtain a weight value which is approximately half the target weight value. The calculation control unit 4 then selects the desired weighing machines but does not yet cause these weighing machines to discharge their articles. Next, the calculation control unit 4 calculates a second target weight value obtained by subtracting the sum total of the weight values from the previously selected weighing machines from the aforementioned target value, again performs a combinatorial calculation using the weight values from the weighing machines not selected by the first operation and the weight values from the weighing machines which did not figure in the first combinatorial calculation, and selects, through the second calculation, a combination giving an optimum combination of weight values with respect to the second target weight values, providing such a combination exists. This is step S8 of the flowchart.

(6) If an optimum combination is found at the step S8, the program proceeds to a step S9, at which the calculation control unit 4 causes the weighing machines selected at the first and second calculations to discharge their articles at one time. More specifically, the number of each machine selected by the first calculation and the weight value from each and every machine are stored in memory, and the batch of articles discharged at one time will have a weight in conformance with the target weight value, namely a weight which is the sum total of the articles from the weighing machines newly selected by the second calculation and the articles from the weighing machines selected initially. In other words, the calculation control unit 4 in this case executes processing for supplying the weighing machines once, performing calculations twice and discharging the articles once.

If, on the other hand, the condition (a) is not satisfied, then the program proceeds from the step S5 to the step S7. In the case where (a) fails to hold, this indicates that the weight total So is more than twice the target weight value, namely that the amount of articles supplied per weighing machine is too large, when H/h is set to 2. Accordingly, the calculation control unit 4, at the steps S7 through S9, causes articles to be discharged through a single combinatorial calculation. In other words, the control unit executes processing for supplying the weighing machines once, performing calculation once and discharging the articles once. It should be noted that the number of weighing machines made to participate in combinatorial weighing in this weighing operation can be made $H \times \frac{2}{3}$ to reduce the number of combinations, thereby raising the speed of the weighing operation.

(7) Next, at a step S10, the calculation control unit 4 causes the weighing machines that have discharged their articles to be supplied with articles anew, after which processing returns to the step S1.

(8) If the decision rendered at the step S8 is that an optimum combination has not been found, then the program proceeds to a step S11, at which the calculation control unit 4 supplies prescribed weighing machines, e.g., weighing machines indicating weight values less than a predetermined percentage of the target weight value, with additional articles. Processing then returns to the step S1.

According to the above-mentioned embodiment, the calculation control unit 4 performs a combinatorial calculation twice at the step S6. However, the calculation control unit 4 can perform a combinatorial calculation more than twice. For example, when the combinatorial calculation is executed three times, the target weight value of the combinatorial calculation to be executed the first time is one-third of the set target weight value Wa, and the target weight values of the suceeding combinatorial calculations can be calculated on the basis of the total weight value of articles in the weighing machines selected by a previous combinatorial calculation and the set target weight value Wa.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing method implemented by a combinatorial weighing apparatus having a plurality of weighing machines for sensing the weight of articles supplied thereto and for producing weight data indicative of the sensed weights, a calculation control unit for performing a combinatorial calculation based on the weight data produced by the weighing machines, and setting units for setting a target weight value and allowable limits for a combinatorial weighing operation, the method comprising steps of:
   (a) subjecting the weight data to a combinatorial calculation performed by the calculation control unit on the basis of predetermined combination patterns;
   (b) calculating, using the calculation control unit, a total weight for all of the weight data from weighing machines that have participated in combinatorial weighing, said step (b) being executed when the combinatorial calculation performed in said step (a) fails to yield an optimum combination; and
   (c) supplementing a predetermined number of weighing machines which have comparatively low weight values, based on the weight data, with articles after comparing, by using the calculation control unit, the total weight calculated in said step (b) with a predetermined percentage of the set target weight value.

2. A method according to claim 1, wherein said step (c) includes supplementing a predetermined number of weighing machines having comparatively low weight values with articles when the total weight is greater than a predetermined percentage of the set target weight value.

3. A method according to claim 1, wherein said step (c) includes supplementing with articles all weighing machines having weight values less than a predetermined weight value when the total weight is less than a predetermined percentage of the set target weight value.

4. A combinatorial weighing method implemented by a combinatorial weighing apparatus having a plurality of weighing machines for sensing the weight of articles supplied thereto and for producing weight data indicative of the sensed weights, a calculation control unit for performing a combinatorial calculation based on the weight data produced by the weighing machines, and setting units for setting a target weight value and allowable limits for a combinatorial weighing operation, the method comprising steps of:
   (a) determining, using the calculation control unit, whether a number of weighing machines capable of participating in a combinatorial calculation is greater than a predetermined number;
   (b) calculating, using the calculation control unit, a total weight for all of the weight data from the weighing machines capable of participating in the combinatorial calculation, said step (b) being executed when the number of weighing machines is determined in said step (a) to be greater than the predetermined number;
   (c) determining the calculation frequency upon comparing, by using the calculation control unit, the total weight calculated in said step (b) with a predetermined percentage of the set target weight value; and
   (d) executing control, by using the calculation control unit, to perform a combinatorial calculation the number of times determined in said step (c), to obtain an optimum combination and to discharge articles from weighing machines corresponding to the optimum combination.

5. A method according to claim 4, wherein said step (d) comprises the following substeps when it is determined in said step (c) that the combinatorial calculation is to be performed twice:
   (d1) selecting a predetermined number of weighing machines to participate in the combinatorial calculation, performing a first combinatorial calculation on the basis of weight data from the selected weighing machines so as to obtain a weight value which is approximately half the target weight value, and selecting the weighing machines combining to provide this weight value;
   (d2) calculating a second target weight value obtained by subtracting from the target weight value the sum of the weight data of the weighing machines selected as a result of the first combinatorial calculation; and
   (d3) obtaining an optimum combination by performing a second combinatorial calculation with respect to the second target weight value on the basis of weight data from weighing machines other than those selected as a result of the first combinatorial calculation.

6. A method according to claim 4, wherein said step (d) includes discharging, through a single discharge, the articles from weighing machines selected by two combinatorial calculations when it is determined in said step (c) that combinatorial calculation is to be performed twice.

7. A combinatorial measuring method for performing combinatorial measuring on a plurality of batches of articles having corresponding measured quantity values, said method being performed under the control of a calculation control unit, said method comprising steps of:
   (a) subjecting the measured quantity values to a combinatorial calculation on the basis of predetermined combination patterns;
   (b) determining whether said step (a) yields an optimum combination of measured quantity values which is within preset allowable limits;

(c) calculating a total quantity for all of the measured quantity values for the batches of articles when it is determined in said step (b) that there is no optimum combination;

(d) comparing the total quantity calculated in said step (c) with a predetermined percentage of a set target quantity value; and (e) supplementing a predetermined number of the batches of articles which have relatively low measured quantity values, with additional articles based on the result of said step (d).

8. A method according to claim 7, wherein said step (e) includes supplementing a predetermined number of batches of articles having comparatively low measured quantity values when the total quantity is greater than the predetermined percentage of the set target value.

9. A method according to claim 7, wherein said step (e) includes supplementing all of the batches of articles having measured quantity values less than a predetermined quantity value when the total quantity is less than the predetermined percentage of the set target value.

10. A method according to claim 7, wherein:

said combinatorial measuring method is a combinatorial weighing method for performing combinatorial weighing on a plurality of batches of articles having corresponding measured weight values;

said step (c) comprises calculating a total weight for all of the measured weight values for the batches of articles when it is determined in said step (b) that there is no optimum combination;

said step (d) comprises comparing the total weight calculated in said step (c) with a predetermined percentage of a set target weight value; and said step (e) comprises supplementing a predetermined number of the batches of articles which have relatively low measured weight values, with additional articles based on the result of said step (d).

11. A method according to claim 10, wherein said step (e) includes supplementing a predetermined number of batches of articles having comparatively low measured weight values when the total weight is greater than the predetermined percentage of the set target weight.

12. A method according to claim 10, wherein said step (e) includes supplementing all of the batches of articles having measured weight values less than a predetermined weight value when the total weight is less than the predetermined percentage of the set target weight.

13. A combinatorial measuring method for performing combinatorial measuring on a plurality of batches of articles having corresponding measured quantity values, said method being performed under the control of a calculation control unit, said method comprising the steps of:

(a) determining whether a number of batches of articles capable of participating in a combinatorial calculation is greater than a predetermined number;

(b) calculating a total quantity for all of the measured quantity values for the batches of articles capable of participating in the combinatorial calculation when it is determined in said step (a) that the number of batches of articles capable of participating in the combinatorial calculation is greater than the predetermined number;

(c) comparing the total quantity calculated in said step (b) with a predetermined percentage of a set target quantity;

(d) determining a calculation frequency based upon said comparing step (c);

(e) performing a combinatorial calculation the number of times determined in said step (d) to obtain an optimum combination of the measured quantity values; and (f) discharging articles from the batches corresponding to the measured quantity values forming the optimum combination.

14. A method according to claim 13, wherein when it is determined in said step (d) that the combinatorial calculation should be performed twice, said step (e) comprises the substeps of:

(e1) selecting a predetermined number of batches of articles to participate in the combinatorial calculation;

(e2) performing a first combinatorial calculation on the basis of measured quantity values from the selected batches so as to obtain a combined quantity value which is approximately half the set target quantity value, and selecting the batches of articles corresponding to the measured quantity values combining to form this combined quantity value;

(e3) calculating a second target quantity value obtained by subtracting the sum of the measured quantity values of the batches selected in said substep (e2) from the set target quantity value; and (e4) obtaining an optimum combination by performing a second combinatorial calculation with respect to the second target quantity value on the basis of the measured quantity values corresponding to batches of articles other than those batches selected in said substep (e2).

15. A method according to claim 14, wherein said step (f) includes discharging, through a single discharge, the articles from the batches selected by the first and second combinatorial calculations.

16. A method according to claim 13, wherein:

said combinatorial measuring method is a combinatorial weighing method for performing combinatorial weighing on a plurality of batches of articles having corresponding measured weight values;

said step (b) comprises calculating a total weight for all of the measured weight values for the batches of articles capable of participating in the combinatorial calculation;

said step (c) comprises comparing the total weight calculated in said step (b) with a predetermined percentage of a set target weight value.

17. A method according to claim 16, wherein when it is determined in said step (d) that the combinatorial calculation is to be performed twice, said step (e) comprises the substeps of:

(e1) selecting a predetermined number of batches of articles to participate in the combinatorial calculation;

(e2) performing a first combinatorial calculation on the basis of measured weight values from the selected batches so as to obtain a combined weight value which is approximately half the set target weight value, and selecting the batches of articles corresponding to the measured weight values combining to form this combined weight value;

(e3) calculating a second target weight value obtained by subtracting the sum of the measured weight values of the batches selected in said substep (e2) from the set target weight value; and (e4) obtaining an optimum combination by performing a second combinatorial calculation with respect to the second target weight value on the basis of the measured weight values corresponding to batches of articles other than those selected in said substep (e2).

18. A method according to claim 17, wherein said step (f) includes discharging, through a single discharge, the articles from the batches selected by the first and second combinatorial calculations.

* * * * *

UNITED STATES PATENT AND TRADEMARK OFFICE
CERTIFICATE OF CORRECTION

PATENT NO. : 4,627,012
DATED : DECEMBER 2, 1986
INVENTOR(S) : SEIJI YAMADA

It is certified that error appears in the above-identified patent and that said Letters Patent is hereby corrected as shown below:

```
Col. 1, line 55, "memory)" should be --memory--;
        line 56, "ory," should be --ory),--.

Col. 5, line 5, "P3" should be --P2--;
        line 6, "P2" should be --P3--.

Col. 7, line 42, "prti-" should be --parti- --;
        line 43, "cipting" should be --cipating--.

Col. 8, line 25, "values," should be --value,--.
```

Signed and Sealed this

Seventh Day of April, 1987

Attest:

DONALD J. QUIGG

*Attesting Officer*   *Commissioner of Patents and Trademarks*